United States Patent Office 3,121,102
Patented Feb. 11, 1964

3,121,102
PROCESS FOR PREPARING SULFONYLUREAS
Roger J. Tull, Plainfield, and John M. Chemerda, Metuchen, N.J., assignors to Merck & Co., Inc., Rahway, N.J., a corporation of New Jersey
No Drawing. Filed Jan. 26, 1959, Ser. No. 788,751
5 Claims. (Cl. 260—397.7)

This invention relates to a novel process for making sulfonylureas.

Various methods of making sulfonylureas have been suggested in the prior art. Difficulties have been encountered in all of these processes. In some cases yields have been too low due to side reactions. Another difficulty which has been encountered is the use of reagents which are either toxic, expensive, or unstable.

An object of this invention is to provide a process for preparing sulfonylureas having hypoglycemic activity in high yields with a minimum of side reactions.

A further object of this invention is to prepare sulfonylureas from starting materials which are non-toxic, stable, and inexpensive.

These and other objects will be apparent from the specification which follows.

According to the present invention a sulfonamide salt is reacted with a symmetrical di-substituted lower alkyl or cycloalkyl urea in which one of the hydrogen atoms attached to each nitrogen atom is unsubstituted. The reaction according to the present invention may be represented by the following equation:

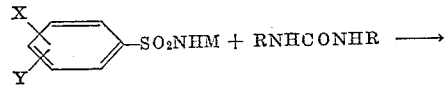

where R is selected from the group consisting of lower alkyl and cycloalkyl radicals, M is selected from the group consisting of alkyl and alkaline earth metals, X is selected from the group consisting of hydrogen, halogen, nitro, amino, lower alkyl, and lower alkoxy, and Y is selected from the group consisting of hydrogen, halogen and lower alkyl.

The reaction is conducted either in the dry state or in an organic liquid medium at an elevated temperature. The by-product amine is generally vaporized under the reaction conditions and continuously removed. This reaction proceeds in nearly quantitative yields with a minimum of side reactions. The free sulfonylurea having the general formula

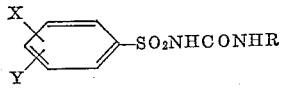

is obtained from the corresponding salt by acidification.

Examples of sulfonamide salts which may be used in the practice of this invention are the alkali and alkaline earth metal salts of benzenesulfonamide, p-toluenesulfonamide, p-chlorobenzenesulfonamide, p-bromobenzenesulfonamide, p-nitrobenzenesulfonamide, sulfanilamide, 3,4-dichlorobenzene-sulfonamide, and 3-amino-4-methylbenzene-sulfonamide. These compounds are merely exemplary; other sulfonamide salts conforming to the general formula indicated in the equation above may also be used.

The sulfonamide salts are easily prepared by dissolving the corresponding sulfonamide in an aqueous solution or suspension of an alkali metal or alkaline earth metal base such as sodium hydroxide, potassium hydroxide, or calcium hydroxide, or a strongly basic salt such as sodium carbonate, and evaporating to dryness.

It is not necessary to isolate the sulfonamide salt. The sulfonamide may be reacted with the basic alkali and alkaline earth metal compound in the presence of the symmetrical urea if desired. In this case the sulfonamide salt is formed in situ and reacts with the di-substituted urea to form the product sulfonylurea.

Among the various symmetrical di-substituted alkyl and cycloalkylureas which are suitable as regents according to this invention are 1,3-diethylurea, 1,3-di-n-propylurea, 1,3-di-n-butylurea, 1,3-diisobutylurea, 1,3-diisoamylurea, and 1,3-dicyclohexylurea. It is essential that the urea be a symmetrical di-substituted lower alkyl or cycloalkyl urea.

Unsymmetrical substituted ureas are not suitable reagents according to this invention because they may react with sulfonamides in several different ways with resultant side reactions and low yield. Tetra-substituted ureas in which all of the hydrogen atoms have been replaced by substituent groups do not react with sulfonamides and are therefore not useful reagents according to the present invention.

The ureas which are used as starting materials according to the present invention may be prepared from urea and the amine hydrochloride or free amine having the same hydrocarbon radical group as that desired in the substituted urea. For example, 1,3-di-n-butylurea may be prepared by the reaction of 1 mole of urea with 2 moles of n-butylamine-hydrochloride. An advantageous procedure for carrying out this reaction is to combine the reagents in the dry state at an elevated temperature on the order of 150° C. The reaction may also be carried out in solution as it would be by Davis and Blanchard, J. Am. Chem. Soc., volume 45, page 1816. A portion of the amine reagent may be supplied by the by-product amine recovered by the sulfonylurea synthesis.

The reaction between the substituted urea and sulfonamide according to the present invention may be carried out in a solvent or not, as desired. It has been found that an excess of the urea reagent is in most cases a very desirable medium for the reaction. However, inert solvents of low volatility may be used instead. These solvents may be either polar or non-polar. It is desirable that the boiling point of the solvent be now below 100° C. and preferably higher. One example of a particularly desirable solvent is sec.-butylbenzene. Other solvents which may be used include other hydrocarbons of lower volatility as well as polar solvents such as diethyleneglycol or the like.

The temperature for carrying out the reaction is in the range of about 75° to about 250° C. The optimum temperature range is generally about 150° to 170° C. Within this temperature range the reaction proceeds to completion within a short time and by-product amine is vaporized.

Either atmospheric or reduced pressure may be used in carrying out the invention. Normally atmospheric pressure is preferred, although the use of reduced pressure is desirable to aid in volatilization of the amine in the event that an amine of low volatility is formed in the reaction. Other means of causing the reaction to proceed to completion are also within the scope of the invention.

After the reaction is complete the sulfonylurea salt product is separated from the other constituents of the reaction product mixture. The preferred method of separation depends on the nature of the other products present. To separate the sulfonylurea product from unreacted 1,3-dibutylurea, for example, the reaction product mixture is diluted with water and the soluble sulfonylurea salt is separated from the insoluble substituted urea reagent by filtration. In the event a water-immiscible solvent has been used in carrying out the reaction, water may be added and the sulfonylurea salt recovered in the aqueous layer. After separation of the sulfonylurea salt, the aqueous solution of the salt is acidified preferably with a dilute solution of a mineral acid and the free sulfonylurea is thereby precipitated.

A number of sulfonylureas having high hypoglycemic activity can be prepared according to the present invention. Among these are 1-n-butyl-3-(p-toluenesulfonyl)-urea, which can be prepared by the reaction of 1,3-di-n-butylurea with the sodium salt or other alkali or alkaline earth metal salt of p-toluenesulfonamide; 1-n-butyl-3-sulfanilylurea, which is prepared by reaction of 1,3-di-n-butylurea with a salt of sulfanilamide; and 1-n-butyl-3-p-chlorobenzenesulfonylurea which is prepared by reaction of 1,3-di-n-butylurea with a salt of p-chlorobenzenesulfonamide. Other hypoglycemic sulfonylureas which can be prepared according to this invention include 1-n-propyl-3-(p-chlorobenzenesulfonyl)urea, 1-cyclohexyl-3-(p-chlorobenzenesulfonyl)urea, 1-n-butyl-3-(p-bromobenzenesulfonyl)urea, 1-n-butyl-3-(3,4-dichlorobenzenesulfonyl)urea, 1-tert.-butyl-3-(p-toluenesulfonyl)-urea, 1-isoamyl-3-(p-toluenesulfonyl)urea, 1-n-hexyl-3-(p-toluenesulfonyl)urea, 1-n-butyl-3-(p-methoxybenzenesulfonyl)urea, and 1-cyclohexyl-3-(3-amino-4-methylbenzenesulfonyl)urea.

The sulfonylureas which can be prepared according to the present process have high hypoglycemic activity when administered orally. For example, tests on mice indicate that 1-n-butyl-3-p-chlorobenzenesulfonylurea reduces the blood sugar content to a level of 83% of that of the untreated animal after a period of two hours when administered orally in a dosage of 18.7 mg. per kilogram of body weight. Higher dosages lower the sugar content of the blood still further. A dose of 150 mk. per kilogram of body weight was found to reduce the blood sugar content to 52% of the level in the animal prior to treatment. The blood sugar level has been found to reach its lowest point approximately two hours after administration and to continue at a low level for approximately one to three hours depending on the amount of sulfonylurea.

The compounds 1-n-butyl-3-(p-chlorobenzenesulfonyl)-urea and 1-n-butyl-3-(p-toluenesulfonyl)urea are highly effective hypoglycemic agents in man and may be administered orally several times a day in total daily dosages of about 1 g. to about 10 g. per day for adults. The other sulfonylureas made according to the present process are also effective hypoglycemic agents in man when administered orally, although in some cases the necessary dosage is somewhat larger than that indicated for 1-n-butyl-3-(p-toluenesulfonyl)urea.

The invention will now be further described with reference to the following examples:

EXAMPLE 1

A mixture of 29 g. of the sodium salt of p-toluenesulfonamide and 51.6 g. of 1,3-di-n-butylurea is heated at 150° C. and 250 mm. absolute pressure with stirring for eight hours. The vacuum is released and the mixture allowed to cool to 125° C. and diluted with 125 ml. of hot water. The mixture is further cooled to 25° C. and filtered to remove the excess dibutylurea. The amount of dibutylurea recovered is 24.2 g. The filtrate is treated with 4 g. of charcoal and poured into a mixture of 120 ml. of 1.25 N-hydrochloric acid and 90 ml. of acetone. The 1-n-butyl-3-(p-toluenesulfonyl)-urea is collected on a filter and washed with water. Yield 37.8 g. (93.3% of theoretical); M.P. 128° to 129.5° C. The pure compound melts at 128.5° to 129.5° C.

EXAMPLE 2

A mixture of 4.64 g. of 1,3-diethylurea and 3.86 g. of the sodium salt of p-toluenesulfonamide is heated at 170° to 180° C. at atmospheric pressure for one hour and 27 minutes with stirring. The mixture is cooled to 110° C., diluted with water, and acidified with dilute hydrochloric acid to a pH of 5.5. The 1-ethyl-3-(p-toluenesulfonyl)urea which precipitated on acidification is collected on a filter and washed first with water and then with aqueous acetone. The product is recrystallized from aqueous alcohol. Yield 2.72 g.; M.P. 139° to 142° C.

*Analysis.*—Calculated for $C_{10}H_{14}N_2O_3S$: C, 49.5%; H, 5.83%; and N, 11.55%. Found: C, 49.63%; H, 5.49%; and N, 11.62%.

EXAMPLE 3

The procedure of Example 1 is followed except that an equivalent quantity of 1,3-diisoamylurea is substituted for 1,3-di-n-butylurea. The product 1-isoamyl-3-(p-toluenesulfonyl)urea is obtained.

EXAMPLE 4

The procedure of Example 1 is followed except that an equivalent quantity of 1,3-di-n-hexylurea is substituted for 1,3-di-n-butylurea. The product 1-n-hexyl-3-(p-toluenesulfonyl)urea is obtained.

EXAMPLE 5

The procedure of Example 1 is followed except that an equivalent quantity of p-methoxybenzenesulfonamide is substituted for p-toluenesulfonamide. The product 1-n-butyl-3-(p-methoxybenzenesulfonyl)urea is obtained.

EXAMPLE 6

A mixture of 30 g. of the sodium salt of 3-amino-4-methylbenzenesulfonamide and 75 g. of 1,3-dicyclohexylurea is heated at 160° C. and 250 mm. absolute pressure with stirring for eight hours. The reaction mixture is then treated according to the procedure of Example 1. The product 1-cyclohexyl-3-(3-amino-4-methylbenzenesulfonyl)urea is obtained.

EXAMPLE 7

A mixture of 27.55 g. of 1,3-di-n-butylurea and 16.42 g. of the sodium salt of p-chlorobenzenesulfonamide is heated at 150° C. under nitrogen with stirring for four hours and twenty minutes. The mixture is cooled to 100° C., diluted with 60 cc. of hot water, cooled to 5° C., and filtered to recover the unused dibutylurea (weight 17.2 g.). The filtrate is acidified to pH 2.5 and the 1-n-butyl-3-(p-chlorobenzenesulfonyl)urea collected on a filter and washed with water. Yield 17.2 g. (76.8% of theoretical); M.P. 115.5° to 116.5° C. When the product is recrystallized from aqueous acetone, the melting point does not change.

*Analysis.*—Calculated for $C_{11}H_{15}ClN_2O_3S$: C, 45.4%; H, 5.20%; N, 9.63%; Cl, 12.18%. Found: C, 45.54%; H, 5.02%; N, 9.47%; Cl, 12.01%.

EXAMPLE 8

The procedure of Example 7 is followed except that an equivalent quantity of 1,3-di-n-propylurea is substituted for 1,3-di-n-butylurea. The product obtained is 1-n-propyl-3-p-chlorobenzenesulfonylurea.

EXAMPLE 9

The procedure of Example 7 is followed except that an equivalent of 1,3-dicyclohexylurea is substituted for an equivalent quantity of 1,3-di-n-butylurea. The product obtained is 1-cyclohexyl-3-p-chlorobenzenesulfonylurea.

EXAMPLE 10

The procedure of Example 7 is followed except that an equivalent quantity of p-bromobenzenesulfonamide is substituted for p-chlorobenzenesulfonamide. The product 1-n-butyl-3-p-chlorobenzenesulfonylurea is obtained.

EXAMPLE 11

The procedure of Example 7 is followed except that an equivalent quantity of 3,4-dichlorobenzenesulfonamide is substituted for p-chlorobenzenesulfonamide. The product 1-n-butyl-3-(3,4-dichlorobenzenesulfonyl)urea is obtained.

EXAMPLE 12

A mixture of 25.8 g. of 1,3-di-n-butylurea and 16.8 g. of the sodium salt of p-nitrobenzenesulfonamide is heated at 145° to 165° C. in a nitrogen atmosphere with stirring for one hour. The mixture is cooled, diluted with water, cooled further to 25° C. and filtered to remove the unreacted dibutylurea. The filtrate is partially neutralized to a pH of 7.3 with dilute hydrochloric acid and filtered to remove the unreacted p-nitrobenzenesulfonamide. The filtrate is then acidified with dilute hydrochloric acid to a pH of 3.8. The 1-n-butyl-3-(p-nitrobenzenesulfonyl) urea is collected on a filter and washed with water. The yield is 9.4 g. The product is recrystallized from aqueous ethanol; M.P. 165° to 168° C.

*Analysis.*—Calculated for $C_{11}H_{15}N_3O_5S$: C, 43.9%; H, 5.03%; N, 13.95%. Found: C, 44.03%; H, 4.79%; N, 14.28%.

EXAMPLE 13

To a warm solution of 25.8 g. of 1,3-di-n-butylurea in 200 ml. of sec.-butylbenzene is added 14.68 g. of the sodium salt of sulfanilamide. The mixture is heated at 150° C. in an atmosphere of flowing nitrogen at atmospheric pressure for six hours with stirring. The mixture is then cooled and diluted with 62.5 ml. of water. The layers are separated and the water layer is treated with charcoal and partially neutralized with dilute hydrochloric acid to a pH of 8.2. The unreacted sulfanilamide is removed by filtration and is found to weight 0.81 g. The filtrate containing the product is acidified to a pH of 5.3 with dilute hydrochloric acid. The 1-butyl-3-sulfanilylurea which precipitates is collected on a filter and washed with water. Yield 15.25 g. (77% of theoretical); M.P. 137.5° to 140° C.

EXAMPLE 14

A mixture of 27.5 g. of the sodium salt of benzenesulfonamide and 52 g. of 1,3-di-n-butylurea is heated at 150° C. and 250 mm. absolute pressure with stirring for eight hours. The product 1-n-butyl-3-benzenesulfonylurea is recovered according to the procedure of Example 1.

EXAMPLE 15

Male rats weighing from 140 to 200 g., which have been held in the laboratory for at least a week before use, are fasted overnight (about 18 hours). On the day of the assay, the rats are weighed and arranged into groups of eight to ten animals. The test compound is dissolved in a minimum volume of 5% NaOH and diluted with Sorensen's buffer (pH 7.8). The volume given to each rat is 2.0 ml. per 100 g. of body weight. The initial sample of blood (0.1 ml.) is taken from the tail and immediately the test material is given by stomach tube. Additional blood samples are taken at hourly intervals for the next five hours and analyzed for blood sugar by the colorimetric method of Nelson, J. Biol. Chem., 153, 375 (1944), using the arsenomolybdate color regent.

In calculating the results, blood sugar is expressed as milligrams per 100 ml. of whole blood. The initial blood sample is the control value and is expressed as 100%.

The results are shown in Table 1 below:

Table 1

| Compound | Oral Dose, mg./kg. | Blood Sugar, Percent of Initial, Hours | | | | |
|---|---|---|---|---|---|---|
| | | 1 | 2 | 3 | 4 | 5 |
| 1-n-butyl-3-(p-chlorobenzene-sulfonyl)urea | 300 | ---- | 62 | ---- | 44 | ---- |
| | 150 | ---- | 52 | ---- | 59 | ---- |
| | 37.5 | ---- | 76 | ---- | 101 | ---- |
| | 18.7 | ---- | 83 | ---- | 107 | ---- |
| 1-n-butyl-3-(3,4-dichlorobenzenesulfonyl)urea | 300 | ---- | 70 | ---- | 84 | ---- |
| 1-ethyl-3-(p-toluene-sulfonyl)urea | 300 | ---- | 67 | ---- | 72 | ---- |
| | 150 | ---- | 85 | ---- | 85 | ---- |
| 1-n-butyl-3-(p-toluene-sulfonyl)urea | 300 | 53 | 46 | 43 | 47 | 47 |
| | 150 | 56 | 45 | 44 | 50 | 66 |
| | 75 | 39 | 43 | 46 | 67 | 80 |
| | 37.5 | ---- | 68 | ---- | 106 | ---- |
| | 18.7 | ---- | 82 | ---- | 105 | ---- |
| 1-n-butyl-3-sulfanilylurea | 300 | ---- | 62 | ---- | 74 | ---- |
| | 150 | ---- | 69 | ---- | 80 | ---- |
| | 75 | ---- | 73 | ---- | 96 | ---- |
| | 37.5 | ---- | 82 | ---- | 94 | ---- |
| 1-n-butyl-3-(p-nitro-benzenesulfonyl)urea | 300 | ---- | 74 | ---- | 119 | ---- |
| | 150 | ---- | 89 | ---- | 119 | ---- |
| 1-isoamyl-3-(p-nitro-benzenesulfonyl)urea | 300 | ---- | 58 | ---- | 99 | ---- |

This application is a continuation-in-part of our co-pending application, Serial No. 610,418, filed September 17, 1956.

What is claimed is:

1. The process for preparing an alkali metal salt of 1-n-butyl-3-(p-toluenesulfonyl)-urea that comprises reacting together at a temperature of between about 75° C. and 250° C. an alkali metal salt of p-toluenesulfonamide and 1,3-di-n-butylurea, and continuously removing n-butylamine from the reaction vessel.

2. The process for preparing an alkali metal salt of 1-n-butyl-3-sulfanilylurea that comprises reacting together at a temperature of between about 75° C. and 250° C. an alkali metal salt of sulfanilamide and 1,3-di-n-butylurea, and continuously removing n-butylamine from the reaction vessel.

3. The process for preparing an alkali metal salt of 1 - n - butyl - 3 - (p - chlorobenzenesulfonyl) - urea that comprises reacting together at a temperature of between about 75° C. and 250° C. an alkali metal salt of p-chlorobenzenesulfonamide and 1,3-di-n-butylurea, and continuously removing n-butylamine from the reaction vessel.

4. The process for preparing a sulfonylurea salt of the formula

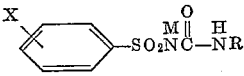

where M is selected from the group consisting of alkali and alkaline earth metals, X is selected from the group consisting of chlorine, bromine, nitro, amino and methyl and R is a lower alkyl radical, which comprises reacting a sulfonamide of the formula

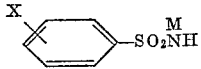

and a symmetrical disubstituted urea of the formula

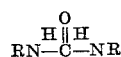

at a temperature of between 75° C. and 250° C., where X, M and R have the above-defined meanings, and continuously removing from the reaction vessel the by-product amine of the formula

where R is as defined above.

5. The process for preparing an alkali metal salt of 1-propyl-3-(p-chlorobenzenesulfonyl)urea which comprises reacting together at a temperature of between about 75° C. and 250° C. an alkali metal salt of p-chlorobenzenesulfonamide and 1,3-di-n-propylurea and continuously removing n-propylamine from the reaction vessel.

References Cited in the file of this patent

UNITED STATES PATENTS

| | | |
|---|---|---|
| 2,385,571 | Haack | Sept. 25, 1945 |
| 2,390,253 | Henke | Dec. 4, 1945 |

FOREIGN PATENTS

| | | |
|---|---|---|
| 604,259 | Great Britain | June 30, 1948 |
| 560,631 | Belgium | Sept. 30, 1957 |
| 196,413 | Austria | Mar. 25, 1958 |

OTHER REFERENCES

Kurzer: Chemical Rev., volume 50, pages 6–7 (1952).